(12) United States Patent
Jiang et al.

(10) Patent No.: US 10,401,949 B2
(45) Date of Patent: Sep. 3, 2019

(54) VIRTUAL REALITY GLASSES

(71) Applicant: Beijing Xiaomi Mobile Software Co., Ltd., Beijing (CN)

(72) Inventors: Hao Jiang, Beijing (CN); Zheng Zhang, Beijing (CN); Yujie Jiang, Beijing (CN); Renlu Peng, Beijing (CN); Xiping Liu, Beijing (CN); Wenhui Ding, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/677,514

(22) Filed: Aug. 15, 2017

(65) Prior Publication Data
US 2018/0059776 A1    Mar. 1, 2018

(30) Foreign Application Priority Data

Aug. 24, 2016  (CN) .......................... 2016 1 0720786

(51) Int. Cl.
*G06F 3/01* (2006.01)
*G02B 27/00* (2006.01)
(Continued)

(52) U.S. Cl.
CPC .......... *G06F 3/011* (2013.01); *G02B 27/0093* (2013.01); *G02B 27/0176* (2013.01);
(Continued)

(58) Field of Classification Search
CPC ................ G09G 5/00; G02B 2027/014; G02B 2027/0178
See application file for complete search history.

(56) References Cited

U.S. PATENT DOCUMENTS 9,733,480 B2    8/2017 Baek et al.
2010/0079356 A1    4/2010 Hoellwarth
(Continued)

FOREIGN PATENT DOCUMENTS

CN    204790193 U    11/2015
CN    105204165 A    12/2015
(Continued)

OTHER PUBLICATIONS

International Search Report issued by the State Intellectual Property Office of the People's Republic of China (SIPO) dated May 2, 2017, in counterpart International Application No. PCT/CN2016/107771.
(Continued)

*Primary Examiner* — Shaheda A Abdin
(74) *Attorney, Agent, or Firm* — Finnegan, Henderson, Farabow, Garrett & Dunner LLP

(57) ABSTRACT

The present disclosure relates to virtual reality glasses. The virtual reality glasses include a glasses body The glasses body includes a first surface towards a user's face and a second surface configured to have an external electronic device mounted thereon for playing virtual reality contents The virtual reality glasses further include a fastening structure configured to fasten the external electronic device to the second surface. The fastening structure includes a connector fastener having a built-in connector which is connectable to an interface at a first end of the external electronic device, and at least one device fastener configured to fasten a second end of the external electronic device.

15 Claims, 7 Drawing Sheets

(51) Int. Cl.
*G02B 27/01* (2006.01)
*G06F 1/16* (2006.01)
*G09G 5/00* (2006.01)

(52) U.S. Cl.
CPC ........ *G06F 1/163* (2013.01); *G02B 2027/014* (2013.01); *G02B 2027/0178* (2013.01); *G09G 5/00* (2013.01)

(56) References Cited

U.S. PATENT DOCUMENTS

| | | | |
|---|---|---|---|
| 2013/0249787 | A1* | 9/2013 | Morimoto ............... G06F 3/012 345/156 |
| 2015/0138645 | A1 | 5/2015 | Yoo et al. |
| 2015/0234189 | A1 | 8/2015 | Lyons |
| 2015/0350397 | A1 | 12/2015 | Vourlat et al. |
| 2016/0062125 | A1 | 3/2016 | Baek et al. |
| 2016/0241289 | A1 | 8/2016 | Wieth |

FOREIGN PATENT DOCUMENTS

| | | |
|---|---|---|
| CN | 204948133 U | 1/2016 |
| CN | 105388615 A | 3/2016 |
| CN | 205333970 U | 6/2016 |
| CN | 105759425 A | 7/2016 |
| CN | 105866954 A | 8/2016 |
| CN | 106154555 A | 11/2016 |
| CN | 205958855 U | 2/2017 |
| EP | 2993577 A1 | 3/2016 |
| JP | 05-191745 A | 7/1993 |
| JP | 08-005953 A | 1/1996 |
| JP | 2016005125 A | 1/2016 |
| WO | WO 2014/181017 A1 | 11/2014 |
| WO | WO 2016/087686 A1 | 6/2016 |
| WO | WO 2018021712 A1 | 2/2018 |

OTHER PUBLICATIONS

Partial European Search Report of European Patent Application No. 17158944.3, from the European Patent office, dated Nov. 21, 2017.

* cited by examiner

VIRTUAL REALITY GLASSES

CROSS-REFERENCE TO RELATED APPLICATION

This application is based on and claims priority to Chinese Patent Application No. 201610720786.3, filed on Aug. 24, 2016, which is incorporated herein by reference in its entirety.

TECHNICAL FIELD

The present disclosure relates to the field of terminal technology, and more particularly, to virtual reality glasses.

BACKGROUND

The virtual reality (VR) technology is a computer simulation system, which can generate a simulated environment and provide an immersive experience for a user by way of three-dimensional dynamic scenes, interactions among entities and so on.

In related conventional technologies, a simple and inexpensive virtual reality solution is provided by providing virtual reality glasses including virtual reality function components and by using an external electronic device such as a user's mobile phone or tablet to play virtual reality content.

However, different external electronic devices may have big differences in sizes, specifications, materials and so on. If an external electronic device is not effectively restricted at a position, the external electronic device is prone to vibrate, shake, or the like during use, which affects a user's immersive experience during use, and even causes the user to feel discomfort such as dizziness.

The virtual reality glasses of the present disclosure are directed towards overcoming one or more the problems set forth above.

SUMMARY

According to a first aspect of embodiments of the present disclosure, virtual reality glasses are provided. The virtual reality glasses include a glasses body. The glasses body includes a first surface towards a user's face and a second surface configured to have an external electronic device mounted thereon for playing virtual reality content. The virtual reality glasses further include a fastening structure configured to fasten the external electronic device to the second surface. The fastening structure includes a connector fastener having a built-in connector. The built-in connector is connectable to an interface at a first end of the external electronic device. The connector fastener enables the built-in connector to rotate between a predetermined maximum tilt opening angle and a horizontal fastening angle. The connector fastener is configured to fasten the first end of the external electronic device at the horizontal fastening angle. The fastening structure further includes at least one device fastener configured to fasten a second end of the external electronic device.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to certain exemplary embodiments, examples of which are illustrated in the accompanying drawings. The following description refers to the accompanying drawings in which the same numbers in different figures represent the same or similar elements unless otherwise indicated. The implementations set forth in the following description of embodiments do not represent all implementations consistent with the disclosure. Instead, they are merely exemplary apparatuses and methods consistent with aspects related to the disclosure as recited in the appended claims.

Figure 1:
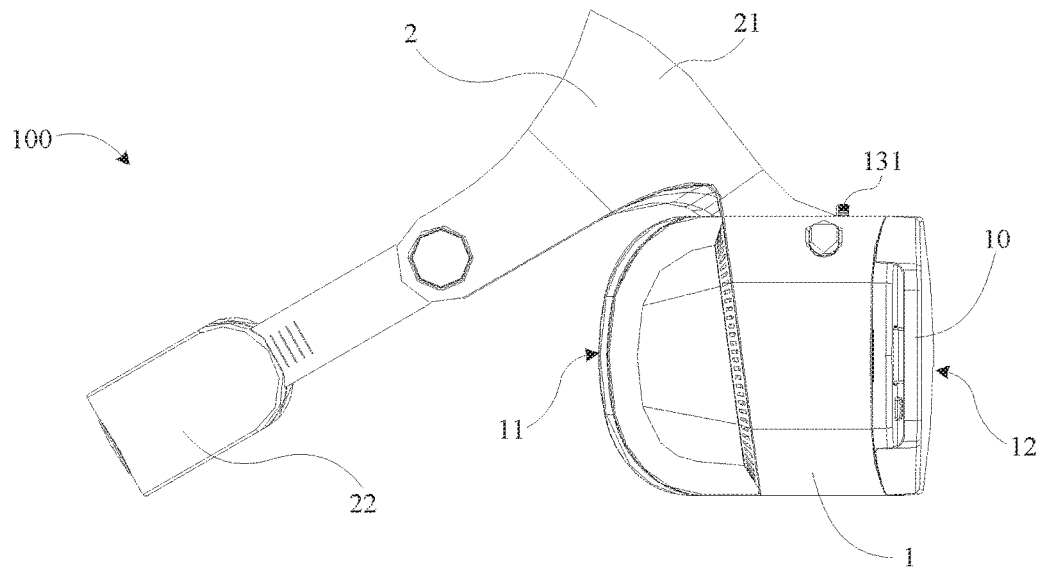
FIG. 1 is a side view of virtual reality glasses according to an exemplary embodiment.
Figure 2:
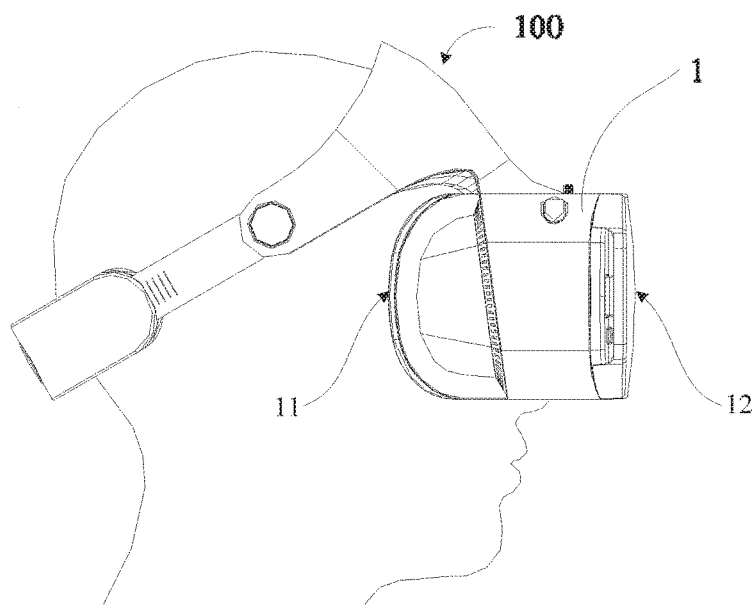
FIG. 2 is a schematic diagram of wearing virtual reality glasses according to an exemplary embodiment.
Figure 3:
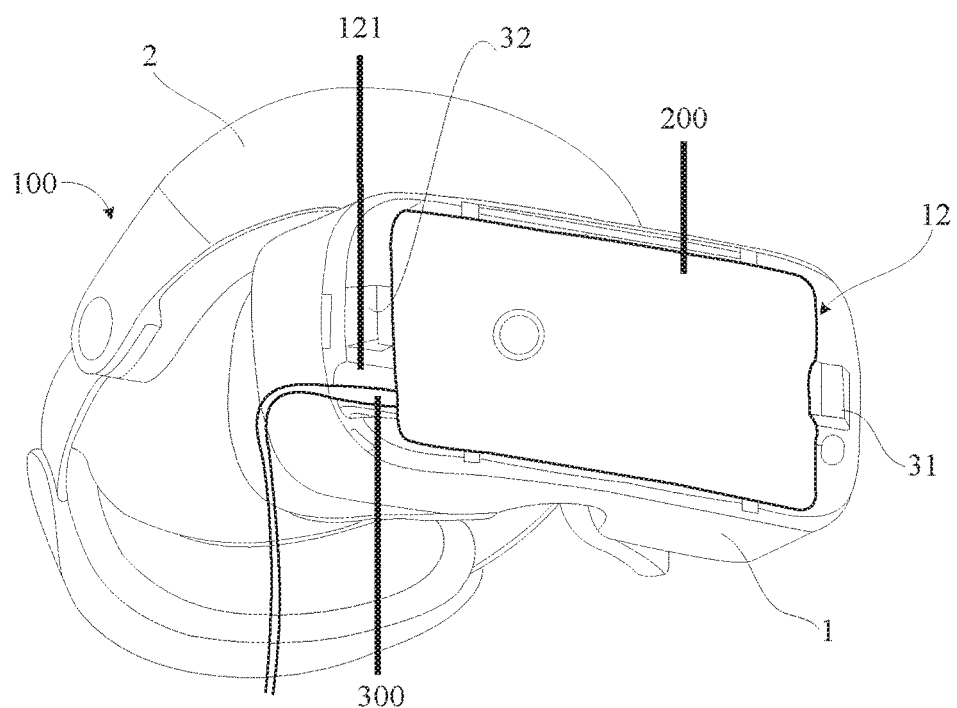
FIG. 3 is an assembly diagram of virtual reality glasses and an external electronic device according to an exemplary embodiment.

FIG. 1 is a side view of virtual reality glasses 100 according to an exemplary embodiment of the present disclosure. As shown in FIG. 1, the virtual reality glasses 100 may include a glasses body 1. The glasses body 1 provides a first surface 11 and a second surface 12. The first surface 11 directs towards a user's face. For example, in FIG. 2 which is a schematic diagram showing that a user wears the virtual reality glasses 100, the first surface 11 directs towards and fits on the user's face, thereby facilitating the user to watch virtual reality content. Meanwhile, when an end cap 10 (FIG. 1) of the glasses body 1 on the second surface 12 is removed, it can be seen, as shown in FIG. 3, that an external electronic device 200 can be mounted on the second surface 12. The external electronic device 200 is configured to play the virtual reality content that the user can watch from the first surface 11.

In order to match the virtual reality content, a headset position groove 121, as shown in FIG. 3, may further be provided in the second surface 12, so that a headset 300 may cooperate with a headset jack in the external electronic device 200 through the headset position groove 121. The headset 300 may output audio content that matches the virtual reality content.

In the exemplary embodiment of the present disclosure, the virtual reality glasses 100 include a fastening structure, which can tightly fasten the external electronic device 200 to the second surface 12, thereby preventing content displayed by the external electronic device 200 from shifting, shaking, etc., relative to the user's sight. This prevents the user's immersive experience from being affected, as well as prevents the user from feeling discomfort such as dizziness caused by screen shaking. For example, as shown in FIG. 3, the fastening structure may include a connector fastener 31 and at least one device fastener 32. The connector fastener 31 is configured to fasten a first end of the external electronic device 200, and the device fastener 32 is configured to fasten a second end of the external electronic device 200. As such, the external electronic device 200 is fastened at multiple positions simultaneously to ensure mounting stability of the external electronic device 200.

The connector fastener 31 includes a built-in connector connecting to an interface at the first end of the external electronic device 200. For example, when the interface of the external electronic device 200 is a USB interface, the connector is a corresponding USB connector. There is no limitation on the interface in the present disclosure. Thus, the first end of the external electronic device 200 is an end where the interface is provided, and the second end is another end opposite to the first end. For example, the first end may be a bottom end of the external electronic device 200, and the second end may be a top end of the external electronic device 200. Accordingly, the connector fastener 31 serves to fasten the external electronic device 200 while docking with the interface of the external electronic device 200. The device fastener 32 does not have a built-in connector, and is used to fasten the external electronic device 200.

The connector fastener 31 and the device fastener 32 may fasten the external electronic device 200 in the following manner.

Figure 4:
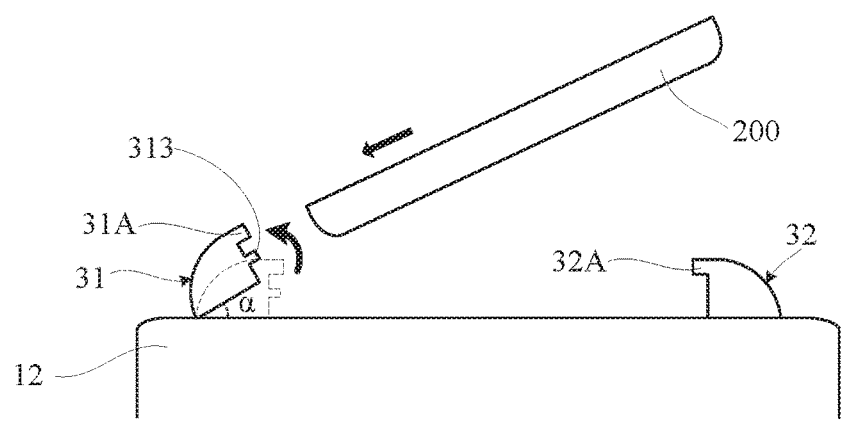
FIGS. 4-5 are schematic diagrams illustrating using a fastening structure to fasten an external electronic device according to an exemplary embodiment.

As shown in FIG. 4, at least a portion of the connector fastener 31 is rotatable. Since a connector 313 is provided in the connector fastener 31, the connector 313 can rotate along with the connector fastener 31 in a rotation angle range which may be between a predetermined maximum tilt opening angle α and a horizontal fastening angle (for any angle in the present disclosure, the direction of the plane where the second surface 12 is located is taken as a horizontal direction). Further, the connector 313 may be plugged into the interface of the external electronic device 200 at any tilt opening angle.

Figure 5:
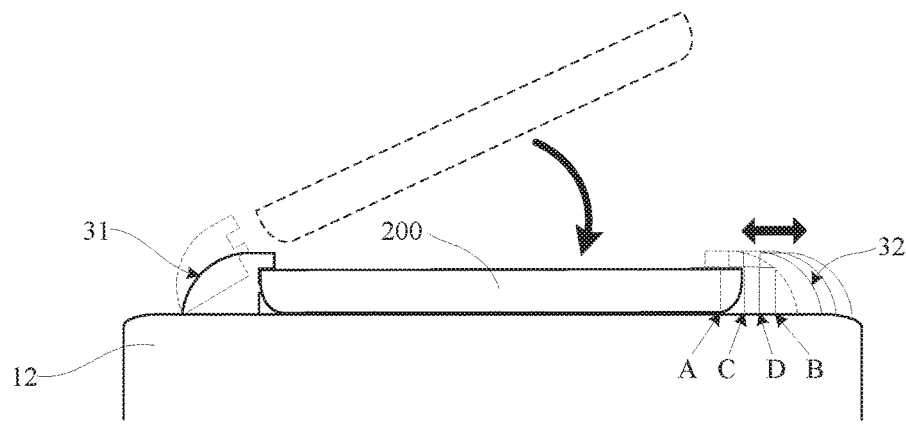

As shown in FIG. 5, after the connector 313 is plugged into the interface of the external electronic device 200, the connector fastener 31 and the external electronic device 200, as a whole, are rotated to the horizontal fastening angle, to enable the connector fastener 31 to fasten the first end (i.e., a left end of the external electronic device 200 in FIGS. 4-5) of the external electronic device 200 through a protrusion 31A. Meanwhile, the device fastener 32 is always kept at the horizontal fastening angle, and may fasten the second end (i.e., a right end of the external electronic device 200 in FIGS. 4-5) of the external electronic device 200 through a protrusion 32A shown in FIG. 4.

In addition, an accommodating chamber is provided between the protrusion 31A and the protrusion 32A. An opening of the accommodating chamber is smaller than the external electronic device 200, so that the protrusion 31A and the protrusion 32A can restrict and fasten the external electronic device 200. In order to enable the external electronic device 200 to smoothly enter the accommodating chamber, the device fastener 32 is capable of horizontally moving back and forth between a maximum opening position and a minimum fastening position which are predetermined on the second surface 12. For example, as shown in FIG. 5, the maximum opening position is at a point B and the minimum fastening position is at a point A. The device fastener 32 is capable of moving back and forth between the point A and the point B.

By moving back and forth between the point A and the point B, the device fastener 32 is suitable for external electronic devices of different sizes, with the device fastener 32 located at different fastening positions as well as different opening positions. For example, as shown in FIG. 5, when the external electronic device 200 is fastened by the device fastener 32, the device fastener 32 is at a point C, that is, the fastening position corresponding to the external electronic device 200 is at the point C. When the device fastener 32 is at any point between a point D and the point B, the external electronic device 200 can be removed from the device fastener 32, that is, the opening position corresponding to the external electronic device 200 is at any point between the point D and the point B.

Accordingly, when the device fastener 32 is moved to a fastening position corresponding to the external electronic device 200, the second end of the external electronic device 200 is fastened by the device fastener 32. When the device fastener 32 is moved to an opening position corresponding to the external electronic device 200, fastening of the external electronic device 200 is released.

Further, a rotatable structure design for the connector fastener 31 plays an important role in the process of mounting the external electronic device 200. The rotatable structure can ensure that the external electronic device 200 is plugged into the connector 313 at a predetermined tilt opening angle and that the external electronic device 200 is rotated from the predetermined tilt opening angle to the horizontal fastening angle.

Since the interface of the external electronic device 200 is small in size, when the connector fastener 31 and the device fastener 32 are used to fasten two ends of the external electronic device 200 respectively, a user tends to first plug the connector 313 into the interface. That is, the user usually does not first use the device fastener 32 to fasten the second end of the external electronic device 200 and then to plug the connector 313 into the interface. In fact, if the second end of the external electronic device 200 is first fastened by the device fastener 32, movable space and other aspects of the external electronic device 200 may be limited. And it is difficult to complete plugging of the connector 313 into the interface.

As shown in FIG. 5, when the external electronic device 200 is finally mounted on the second surface 12, both of the interface of the external electronic device 200 and the connector 313 are at the horizontal fastening angle. Thus, when an angle of the connector 313 is not adjustable, the connector 313 is always kept at the horizontal fastening angle. However, when the user directly plugs the connector 313 into the interface of the external electronic device 200, due to obstruction of the device fastener 32, plugging of the connector 313 into the external electronic device 200 has to be performed in a state (i.e., a state shown in FIG. 4) where a preset angle is kept between the external electronic device 200 and the second surface 12. In other words, a certain angle exists between the external electronic device 200 and the connector 313, which makes it difficult to plug the connector 313 into the external electronic device 200 and further may cause the connector 313 to be broken or the like during the process of plugging.

Thus, in the present disclosure, the structure of the connector fastener 31 is improved to enable the connector 313 to rotate to a preset title opening angle. As such, when the connector 313 is rotated to be parallel to the external electronic device 200 (i.e., which is a situation shown in FIG. 4), it can be ensured that the connector 313 is parallel to the interface of the external electronic device 200 when docking therewith. This not only facilitates plugging, but also effectively prevents the connector 313 from being broken or the like.

Hereinafter, structures of the connector fastener 31 and the device fastener 32 will be described respectively, with reference to FIG. 6 which is an exploded view of the fastening structure.

With respect to the connector fastener 31, in an exemplary embodiment, the connector fastener 31 may include a movable plate 311 and a connector fixing seat 312. The connector fixing seat 312 is hinged to the movable plate 311 to enable the connector fixing seat 312 to rotate between the maximum tilt opening angle and the horizontal fastening angle.

The connector fixing seat 312 may fasten the first end of the external electronic device 200, and the connector 313 is secured within the connector fixing seat 312. For example, the connector fixing seat 312 may include a main portion 312A and a detachable portion 312B. An accommodating cavity may be provided between the main portion 312A and the detachable portion 312B to accommodate the connector 313. An opening may be provided in the detachable portion 312B, so that a port of the connector 313 may extend outside through the opening to be plugged into the interface of the external electronic device 200. After the main portion 312A and the detachable portion 312B are secured together through, for example, screws and so on, the connector 313 may also be pressed and secured by the main portion 312A and the detachable portion 312B, thereby ensuring that the connector 313 is rotated synchronously with the connector fixing seat 312.

Further, by switching among gear positions along the horizontal direction, the connector fastener 31 may be suitable for external electronic devices of different sizes. For example, as shown in FIG. 5, in addition to rotating to the predetermined tilt opening angle, the connector fastener 31 can further be moved along the horizontal direction to a preset gear position, which is similar to the horizontal movement of the device fastener 32. Accordingly, a spacing between the connector fastener 31 and the device fastener 32 can be adjusted to accommodate external electronic devices 200 of different sizes.

Figure 6:
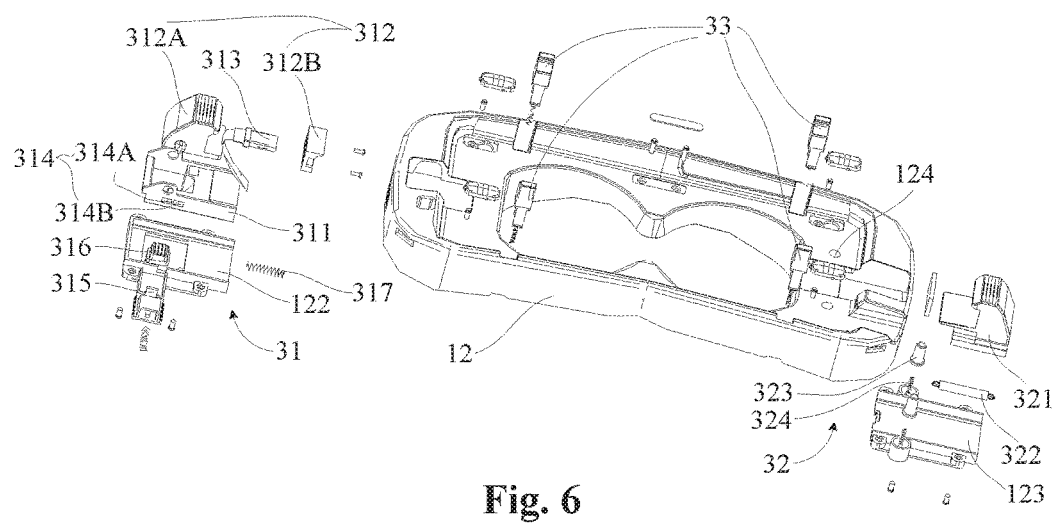
FIG. 6 is an exploded view of a fastening structure of virtual reality glasses according to an exemplary embodiment.

For example, as shown in FIG. 6, the movable plate 311 may slide along a first slide rail 122 on the second surface 12, to cause the connector fixing seat 312 to horizontally move back and forth between a plurality of gear positions. A plurality of notches 314 may be formed in a lateral side of the movable plate 311 and correspond to the plurality of gear positions. The connector fastener 31 may further include a gear-position stopper 315 configured to cooperate with each of the notches 314 to restrict the connector fixing seat 312 to a corresponding gear position. For example, the connector fastener 31 may further include a gear-position adjusting button 316. The gear-position adjusting button 316 may extend through the end cap 10 that is outside of the second surface 12 (FIG. 1). A user can apply an external force to the gear-position adjusting button 316 to trigger the gear-position stopper 315 to move away from the notch where the gear-position stopper 315 is located, thereby releasing the movable plate 311 and the connector fixing seat 312. As a result, the connector fixing seat 312 may be switched from the current gear position to another gear position through a horizontal movement (that is, the gear-position stopper 315 is moved away from the notch corresponding to the current gear position, and engage a notch corresponding to the other gear position).

For example, in the exemplary embodiment shown in FIG. 6, a first notch 314A and a second notch 314B are horizontally formed in a lateral wall of the movable plate 311, and correspond to a first gear position and a second gear position of the connector fastener 31, respectively. The connector fastener 31 may further include a first elastic element 317. When the gear-position stopper 315 engages with the first notch 314A, the first elastic element 317 is deformed to make the movable plate 311 tend to move horizontally. When an external force is applied to the gear-position adjusting button 316 to trigger the gear-position stopper 315 to move away from the first notch 314A, the movable plate 311 may be driven by the first elastic element 317 to move horizontally. Then, when a horizontal movement distance of the movable plate 311 matches a spacing between the first notch 314A and the second notch 314B, the second notch 314B horizontally moves along with the movable plate 311 to a position where it is just to be able to engage with the gear-position stopper 315.

For example, as shown in FIG. 6, it is assumed that the first notch 314A is located at a left side of the second notch 314B and the first elastic element 317 is at a right side of the movable plate 311. When the movable plate 311 moves to the rightmost position, the first notch 314A just engages with the gear-position stopper 315. At this point, the first elastic element 317 is compressed by the movable plate 311, so that the first elastic element 317 produces a reaction force towards the left side. When the gear-position adjusting button 316 is pressed by the user, the gear-position stopper 315 moves away from the first notch 314A, so that the movable plate 311 moves towards the left to the leftmost position under action of the first elastic element 317. As a result, the second notch 314B just aligns with the gear-position stopper 315, so that the gear-position stopper 315 may enter the second notch 314B to engage with the second notch 314B.

Further, each notch in the movable plate 311 may include a first horizontal lateral wall and a second horizontal lateral wall. The first horizontal lateral wall may cooperate with the gear-position stopper 315 to limit the gear position, so as to restrict a movement of the movable plate 311 towards a first horizontal direction. The second horizontal lateral wall is of a slope shape. When the movable plate 311 is moved towards a second horizontal direction, the gear-position stopper 315 may slide outside of the corresponding notch along the second horizontal lateral wall. The second horizontal direction is opposite to the first horizontal direction. Since the movable plate 311 is moved along a horizontal direction and the notches are in the lateral wall of the movable plate 311, the plurality of notches are arranged along the horizontal direction and each notch has two lateral walls in the horizontal direction.

Figure 7:
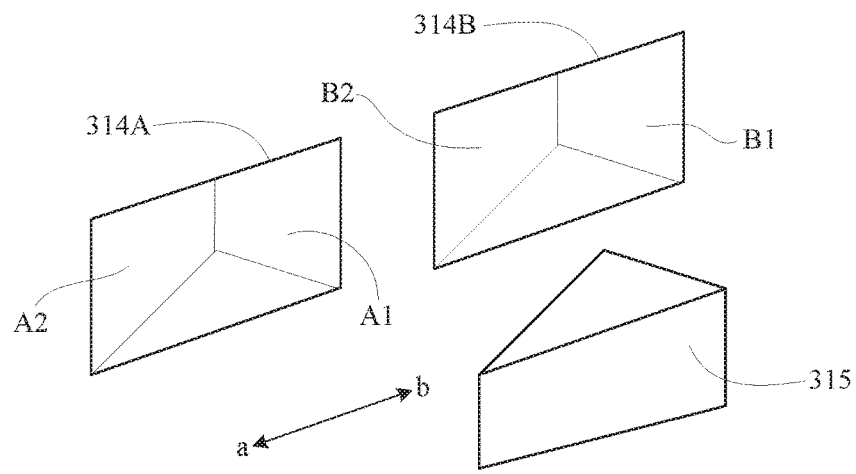
FIG. 7 is a schematic diagram illustrating engagement between recesses and a protrusion of a connector fastener according to an exemplary embodiment.

For example, as shown in FIG. 7, the first notch 314A includes a first horizontal lateral wall A1 and a second horizontal lateral wall A2. The second notch 314B includes a first horizontal lateral wall B1 and a second horizontal lateral wall B2. The first horizontal direction may be a direction a, and the second horizontal direction may a direction b. As can be seen from FIG. 7, the first horizontal lateral wall A1 and the second horizontal lateral wall A2 both can engage with the gear-position stopper 315, so as to restrict a movement of the movable plate 311 towards the direction a. However, since the second horizontal lateral wall A2 and the second horizontal lateral wall B2 each are of a slope shape, when the gear-position stopper 315 is in the second notch 314B, by pushing the entire movable plate 311 towards the direction b, the gear-position stopper 315 can slide outside of the second notch 314B along the second horizontal lateral wall B2 and further slides into the first notch 314A.

Referring back to FIG. 6, when the gear-position stopper 315 is located in the first notch 314A to cause the connector fastener 31 at the first gear position, the user may press the gear-position adjusting button 316 to cause the gear-position stopper 315 to move away from the first notch 314A. Then, the movable plate 311 can be driven by the first elastic element 317 to move towards left so that the gear-position stopper 315 enters the second notch 314B and limits the connector fastener 31 at the second gear position. Further, when the user pushes the movable plate 311 or the connector fixing seat 312 to cause the movable plate 311 to move towards the right, the second horizontal lateral wall B2 of slope shape as shown in FIG. 7 enables the gear-position stopper 315 to move away from the second notch 314B and return to the first notch 314A to limit the connector fastener 31 at the first gear position. Thus, by pressing the gear-position adjusting button 316 and pushing the connector fixing seat 312, adjustment of gear positions of the connector fastener 31 can be achieved, and the operations are simple and effective.

With respect to the device fastener 32, in the exemplary embodiment, as shown in FIG. 6, the device fastener 32 may include a device fixing seat 321, which can fasten the second end of the external electronic device 200. The device fixing seat 321 can slide along a second slide rail 123 on the second surface 12. The device fastener 32 may further include a second elastic element 322. When the device fixing seat 321 is at a position other than the minimum fastening position (e.g., the point A shown in FIG. 5), the second elastic element 322 is deformed to cause the device fixing seat 321 to have a movement tendency for returning to the minimum fastening position. Thus, unlike the connector fastener 31 having adjustable gear positions, the device fixing seat 321 has no gear positions when the device fixing seat 321 is moved along the horizontal direction. Rather, the device fixing seat 321 can move freely between the minimum fastening position and the maximum opening position, thereby being suitable for external electronic devices of different sizes.

The size of the external electronic device 200 is usually larger than a distance between the connector fastener 31 and the minimum fastening position of the device fastener 32. As a result, after the external electronic device 200 has been mounted, the second elastic element 322 is always in a deformed state, thereby enabling the device fastener 32 to clamp the external electronic device 200 along the horizontal direction. Accordingly, mounting stability of the external electronic device 200 is ensured.

In the virtual reality glasses 100 of the present disclosure, in addition to the connector fastener 31 and the device fastener 32, as shown in FIG. 6, the fastening structure may further include at least one lateral side fastener 33, as shown in FIG. 6, to fasten the external electronic device 200 at a lateral side position of the external electronic device 200. As a result, the lateral side fastener 33, the connector fastener 31 and the device fastener 32 together tightly fasten the external electronic device 200.

In addition, in order to facilitate removal of the external electronic device 200, the virtual reality glasses 100 of the present disclosure may further include at least one device bouncing-up structure. As shown in FIG. 6, the device bouncing-up structure may include a support member 323 in a preset hole 124 in the second surface 12, and a third elastic element 324 arranged at a bottom of the support member 323.

When the external electronic device 200 has not been mounted, at least a portion of the support member 323 can extend outside of the preset hole 124, and the third elastic element 324 almost has no deformation. When the external electronic device 200 has been fastened to the second surface 12, the external electronic device 200 can press the support member 323, and thus cause the third elastic element 324 at the bottom of the support member 323 to be deformed as well as cause at least a portion of the support member 323 to be retracted into the preset hole 124. Further, when fastening of the external electronic device 200 is released by the device fastener 32, a reaction force generated by the third elastic element 324 due to deformation may drive the support member 323 to extend outside of the preset hole 124 to lift up the external electronic device 200, thereby enabling a certain angle to be formed between the external electronic device 200 and the second surface 12 to facilitate the user to detach and remove the external electronic device 200.

Further, as shown in FIG. 1, in addition to the glasses body 1 and the fastening structure, the virtual reality glasses 100 of the present disclosure may further include a wearing structure 2 for securing the glasses body 1 to the user's face. The wearing structure 2 may include: a fixed connection portion 21 and a wearing adjustment portion 22. A bottom of the fixed connection portion 21 is fixedly connected to a top portion of the glasses body 1. The fixed connection portion 21 and the wearing adjustment portion 22 each have an arc shape, and they constitute a ring structure that fits the user's head so that the user may wear the virtual reality glasses 100 in a manner such as shown in FIG. 2. The wearing adjustment portion 22 is configured to adjust a size of the ring structure, thereby enabling the wearing structure 2 to be suitable for sizes of different users' heads.

In the exemplary embodiment, both of the fixed connection portion 21 and the wearing adjustment portion 22 may be made of hard materials, and can maintain their own states in normal conditions. Compared with soft headbands in related conventional art, the user does not need to manually adjust the state of the wearing structure 2 made of hard materials every time the user wears it. And this facilitates the user to quickly wear the virtual reality glasses 100. In some embodiments, soft materials such as sponge and/or silicone may be provided at inner sides of the fixed connection portion 21 and the wearing adjustment portion 22, so that the user may feel comfortable.

Figure 8:
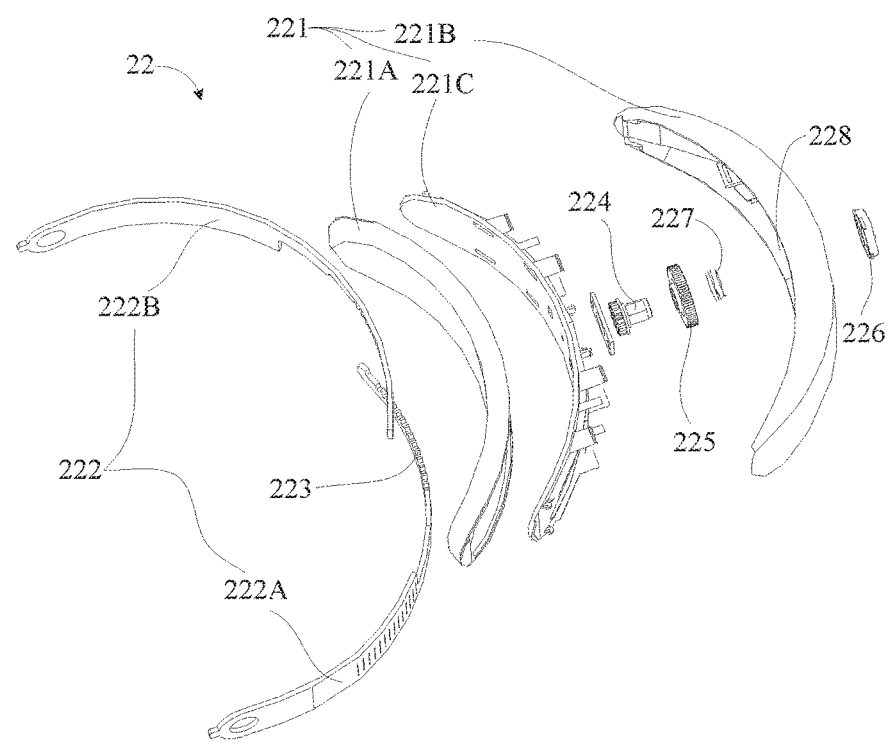
FIG. 8 is an exploded view of a wearing adjustment portion of a wearing structure of virtual reality glasses according to an exemplary embodiment.

In some embodiments, as shown in FIG. 8, the wearing adjustment portion 22 may include an adjustment portion body 221 in which an adjusting gear 224 is provided. The adjustment portion body 221 may include a front layer 221A, a rear layer 221B and a substrate 221C. An accommodating space is provided by the front layer 221A and the rear layer 221B, to accommodate the substrate 221C and the adjusting gear 224 therein. The wearing adjustment portion 22 may further include an adjustment band 222 extending out from the adjustment portion body 221. For example, as shown in FIG. 8, the adjustment band 222 includes a first adjustment band 222A and a second adjustment band 222B. Taking the first adjustment band 222A as an example, a first end of the first adjustment band 222A is connected with the fixed connection portion 21. And a gear belt 223 is provided at a portion of the first adjustment band 222A near a second end of the first adjustment band 222A. The gear belt is configured to match the adjusting gear 224.

When the adjusting gear 224 is rotated towards a first direction, the gear belts 223 of the adjustment band 222 cooperate with the adjusting gear 224 to cause the adjustment band 222 to extend further outwardly from the adjustment portion body 221, thereby enlarging the ring structure defined by the fixed connection portion 21 and the wearing adjustment portion 22. When the adjusting gear 224 is rotated towards a second direction, the gear belts 223 cooperate with the adjusting gear 224 to retract the corresponding adjustment band 222 further into the adjustment portion body 221, thereby decreasing the ring structure.

In other words, when the adjustment portion body 221 and the fixed connection portion 21 are connected through the adjustment band 222, the rotational cooperation between the adjustment band 222 and the adjusting gear 224 can control a length by which the adjustment band 222 extends outwardly from or retracts into the adjustment portion body 221 (i.e., controlling a distance between the adjustment portion body 221 and the fixed connection portion 21), thereby adjusting the size of the ring structure formed by the fixed connection portion 21 and the wearing adjustment portion 22.

Further, an adjustment knob 225 may be provided in the adjustment portion body 221 and is capable of rotating synchronously with the adjusting gear 224. A self-locking protrusion is provided at a surface of the adjustment knob 225. The self-locking protrusion may engage with a self-locking recess 228 in an inner wall of the adjustment portion body 221 (for example, in an inner wall of the rear layer 221B). Thus, when the self-locking protrusion at the surface of the adjustment knob 225 engages with the self-locking recess 228, the adjusting gear 224 and the adjustment knob 225 are switched to a rotation self-locking state to prevent adjustment of the size of the ring structure. When the self-locking protrusion disengages from the self-locking recess 228, the adjusting gear 224 and the adjustment knob 225 are switched to a free rotation state, in which the size of the ring structure can be adjusted via rotation of the adjusting gear 224 and the adjustment knob 225.

The engagement state between the self-locking protrusion and the self-locking recess 228 may be adjusted in a plurality of manners, thereby switching the adjusting gear 224 and the adjustment knob 225 to the rotation self-locking state or the free rotation state. This is illustrated with the following examples.

In some embodiments, as shown in FIG. 8, the adjustment portion body 221 may include therein an adjustment button 226 and a fourth elastic element 227. An installation position of the adjustment button 226 on the adjustment portion body 221 corresponds to the adjustment knob 225. When the adjustment button 226 is pressed, for example by an external force, the adjustment button 226 can push the adjustment knob 225 to move, thereby switching the adjustment knob 225 to the free rotation state (that is, when the adjustment knob 225 is not pushed to move, the adjustment knob 225 is in the rotation self-locking state).

The fourth elastic element 227 is deformed when the adjustment knob 225 is switched to the rotation self-locking state (for example, the fourth elastic element 227 is pressed by the adjustment button 226 to be deformed). When the external force pressing the adjustment button 226 stops, the fourth elastic element 227 drives the adjustment knob 225 to return to the rotation self-locking state.

Figure 9:
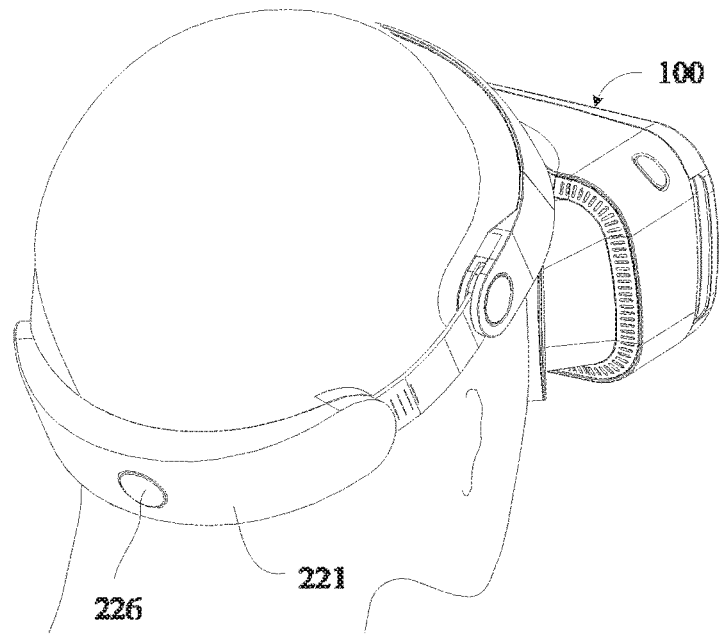
FIG. 9 is a schematic diagram illustrating wearing and adjusting virtual reality glasses according to an exemplary embodiment.

Thus, as shown in FIG. 9, when the user intends to adjust the wearing structure 2, the user may press the adjustment button 226, for example using a finger, at a rear side of the adjustment portion body 221. Then, by manually pulling outwardly or pushing inwardly the entire adjustment portion body 221, cooperation between the adjusting gear 224 and the adjustment band 222 can be actuated to enlarge or decrease the size of the ring structure.

Figure 10:
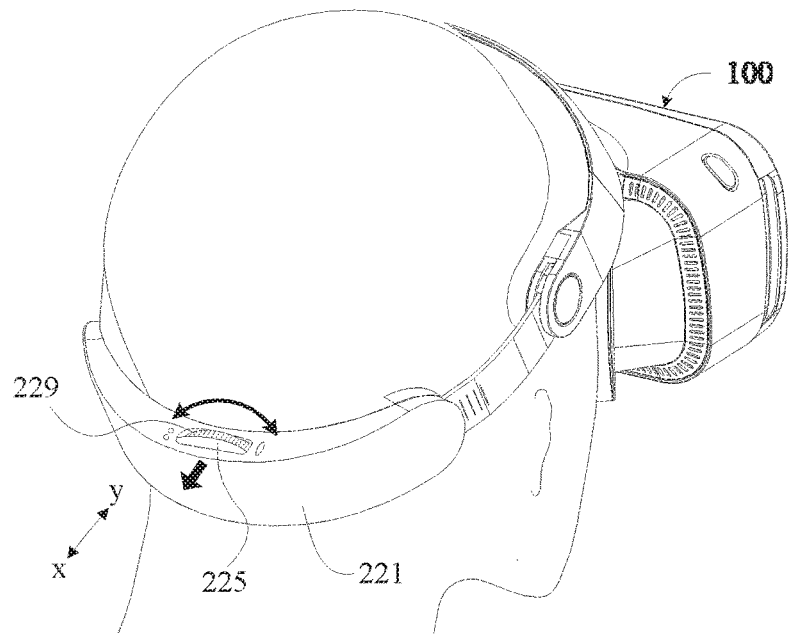
FIG. 10 is a schematic diagram illustrating wearing and adjusting virtual reality glasses according to another exemplary embodiment.

In some embodiments, as shown in FIG. 10, at least a portion of the adjustment knob 225 may extend outside through a preset opening 229 in the adjustment portion body 221. Thus, when the adjustment knob 225 is moved along a first axis direction (e.g., a direction x) under action of an external force to a first side of the preset opening 229 (for example, the first side may be a side away from the user), the adjustment knob 225 is switched to the rotation self-locking state. When the adjustment knob 225 is moved along a second axis direction (e.g., a direction y) under action of an external force to a second side of the preset opening 229 (for example, the second side may be a side towards the user), the adjustment knob 225 is switched to the free rotation state. As such, the user can directly apply an external force to the adjustment knob 225 to cause the adjustment knob 225 to rotate (around a rotation axis) so as to adjust the size of the ring structure.

Figure 11:
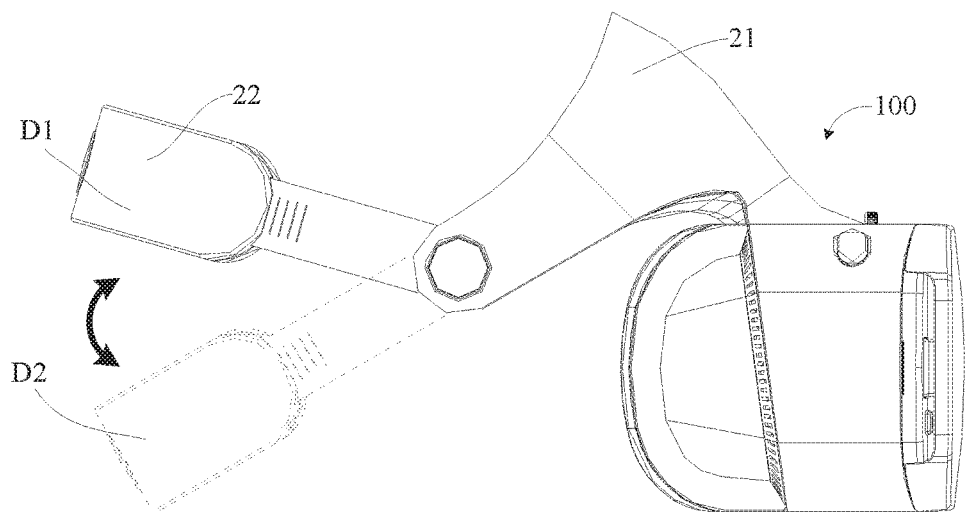
FIG. 11 is a schematic diagram illustrating adjusting engagement between a fixed connection portion and a wearing adjustment portion of virtual reality glasses according to an exemplary embodiment.
Figure 12:
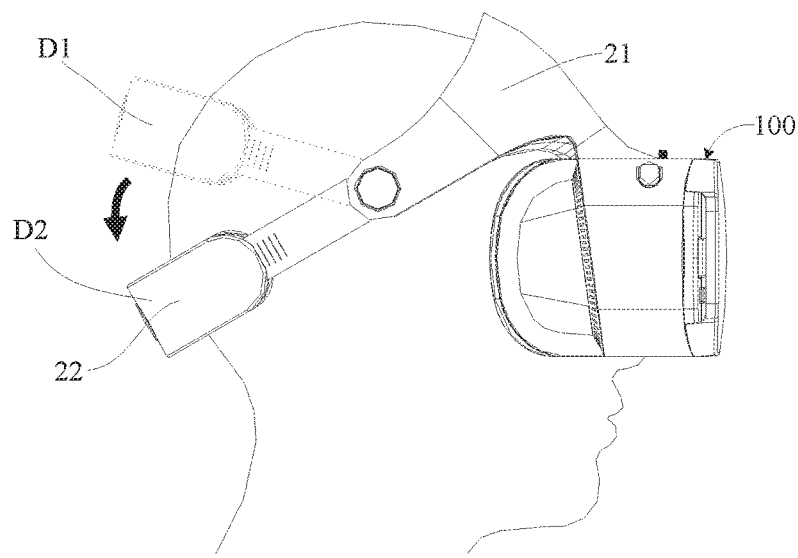
FIG. 12 is a schematic diagram illustrating wearing virtual reality glasses according to an exemplary embodiment.

In some embodiments, as shown in FIG. 11, the wearing adjustment portion 22 is rotatably connected with the fixed connection portion 21. The user may first rotate the wearing adjustment portion 22 to a position D1 shown in FIG. 11, After the wearing adjustment portion 22 is worn on the user's head, the wearing adjustment portion 22 is rotated downward from the position D1 to a position D2 as shown in FIG. 12, thereby enabling the virtual reality glasses to be easily worn without repeatedly adjusting wearing postures.

Further, if the user, when wearing and using the virtual reality glasses 100, wants to leave the virtual reality world for a moment but does not want to take off the virtual reality glasses 100, the glasses body 1 and the fixed connection portion 21 as a whole may be lifted up (e.g., frames of the two portions may be integrally formed) relative to the wearing adjustment portion 22. As a result, the user can temporarily leave the virtual reality world to deal with external things for a moment. After dealing with the external things, it is merely needed to turn down the glasses body 100 and the fixed connection portion 21 as a whole, so that the user can quickly return to the virtual reality world. There is no need to take off the virtual reality glasses 100 and wear the virtual reality glasses 100 again in the whole process, which facilitates the user's quick operation.

Figure 13:
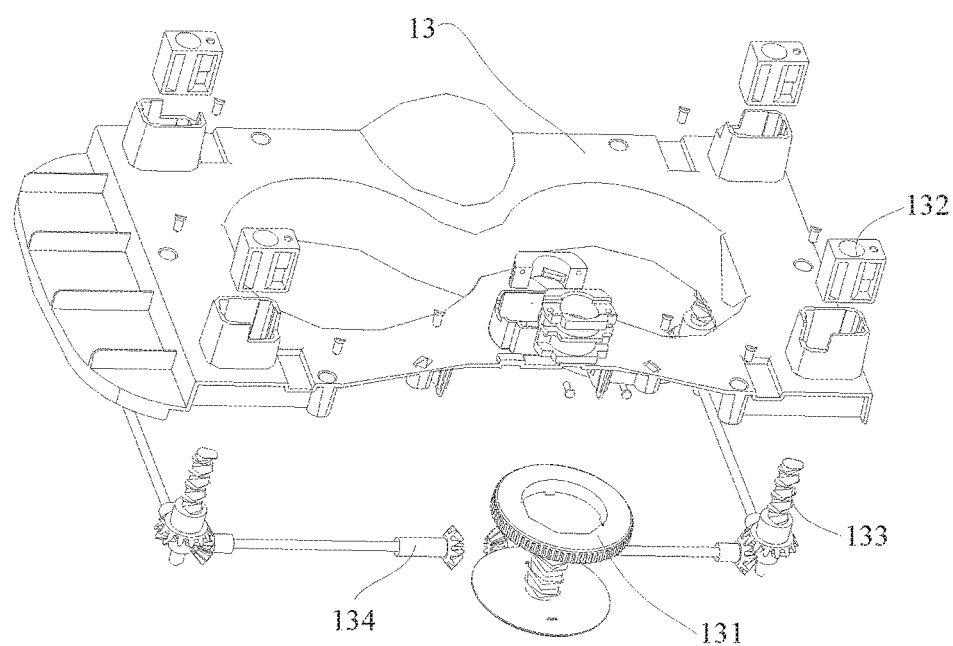
FIG. 13 is an exploded view of an object distance adjusting structure of virtual reality glasses according to an exemplary embodiment.

In some embodiments, the virtual reality glasses 100 may further include an object distance adjusting structure as shown in FIG. 13, which is configured to adjust a distance between a lens assembly 13 in the glasses body 1 and the external electronic device 200. The object distance adjusting structure may include an object distance adjusting knob 131, an adjusting nut 132, an adjusting threaded rod 133 and a helical gear set 134.

Figure 14:
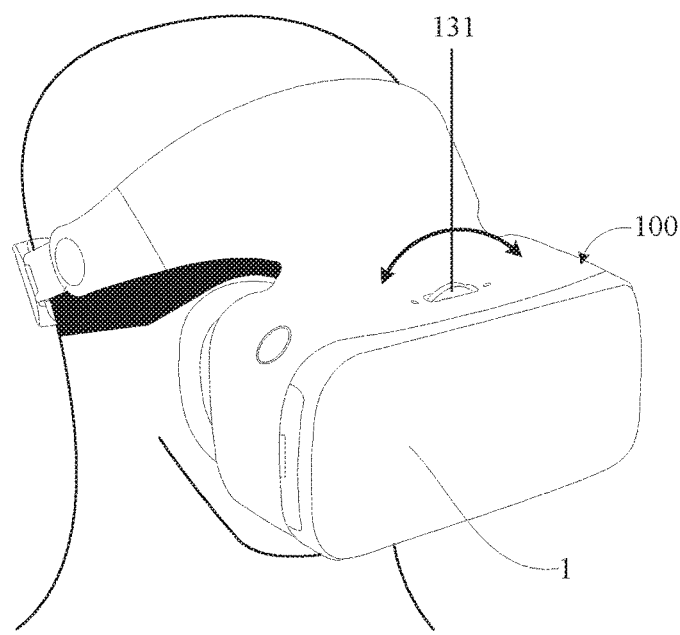
FIG. 14 is a schematic diagram illustrating adjusting an object distance of virtual reality glasses according to an exemplary embodiment.

At least a portion of the object distance adjusting knob 131 may extend outside through a preset opening in the glasses body 1. For example, as shown in FIG. 14, the object distance adjusting knob 131 extends outside from a top side of the glasses body 1.

The adjusting nut 132 is secured on the lens assembly 13. The adjusting threaded rod 133 is in engagement with the adjusting nut 132. The adjusting nut 132 and the adjusting threaded rod 133 are oriented towards the external electronic device 200.

The helical gear set 134 is rotated along with the object distance adjusting knob 131 when the object distance adjusting knob 131 is driven by an external force to rotate. The adjusting threaded rod 133 is rotated accordingly. Thus, based on a relative rotation between the adjusting nut 132 and the adjusting threaded rod 133, a distance between the adjusting nut 132 and the adjusting threaded rod 133 is changed accordingly. Meanwhile, positions of the object distance adjusting knob 131, the helical gear set 134 and the adjusting threaded rod 133 are not changed, and a position of the external electronic device 200 is also not changed. Therefore, positions of the adjusting nut 132 and the lens assembly 13, on which the adjusting nut 132 is secured, are changed relative to the external electronic device 200, thereby achieving adjustment of a distance between the lens assembly 13 and the external electronic device 200.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. The specification and examples are intended to be exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:
1. Virtual reality glasses, comprising:
a glasses body, the glasses body including a first surface towards a user's face and a second surface configured to have an external electronic device mounted thereon for playing virtual reality contents; and
a fastening structure configured to fasten the external electronic device to the second surface, the fastening structure including:
  a connector fastener having a built-in connector, wherein the built-in connector is connectable to an interface at a first end of the external electronic device, the connector fastener enables the built-in connector to rotate between a predetermined maximum tilt opening angle and a horizontal fastening angle, and the connector fastener is configured to fasten the first end of the external electronic device at the horizontal fastening angle; and
  at least one device fastener configured to fasten a second end of the external electronic device,
wherein:
  the device fastener is configured to horizontally move back and forth between a maximum opening position and a minimum fastening position which are predetermined at the second surface,
  when the device fastener is moved to a corresponding fastening position, the second end of the external electronic device is fastened by the device fastener, and
  when the device fastener is moved to a corresponding opening position, fastening of the external electronic device is, released.

2. The virtual reality glasses according to claim 1, wherein the connector fastener is suitable for external electronic devices of different sizes by switching among a plurality of gear positions along a horizontal direction.

3. The virtual reality glasses according to claim 2, wherein the connector fastener comprises:
a connector fixing seat configured to fasten the first end of the external electronic device, wherein the built-in connector is secured within the connector fixing seat;
a movable plate hinged to the connector fixing seat to enable the connector fixing seat to rotate between the maximum tilt opening angle and the horizontal fastening angle, wherein the movable plate is configured to slide along a first slide rail on the second surface, so as to drive the connector fixing seat to horizontally move back and forth between the plurality of gear positions, and a plurality of notches corresponding to the plurality of gear positions are provided in a lateral side of the movable plate;
a gear-position stopper configured to engage with one of the notches so as to restrict the connector fixing seat to one of the gear positions corresponding to the one of the notches; and
a gear-position adjusting button, wherein when an external force is applied to the gear-position adjusting button, the gear-position adjusting button is configured to trigger the gear-position stopper to move away from the one of the notches so that the connector fixing seat is switched from a current gear position to another gear position through a horizontal movement.

4. The virtual reality glasses according to claim 3, wherein:
the plurality of notches include a first notch and a second notch corresponding respectively to a first gear position and a second gear position of the plurality of gear positions, and a horizontal movement distance of the movable plate matches a distance between the first notch and the second notch;
the connector fastener further comprises a first elastic element configured to be deformed and to cause a tendency for moving the movable plate horizontally when the gear-position stopper engages with the first notch; and
when the external force is applied to the gear-position adjusting button to trigger the gear-position stopper to move away from the first notch, the movable plate is driven by the first elastic element to move horizontally so that the second notch horizontally moves along with the movable plate until the second notch engages with the gear-position stopper.

5. The virtual reality glasses according to claim 3, wherein each notch comprises:
a first horizontal lateral wall configured to engage with the gear-position stopper to limit a gear position so as to restrict movement of the movable plate towards a first horizontal direction; and a second horizontal lateral wall of a slope shape, wherein when the movable plate is moved towards a second horizontal direction, the gear-position stopper slides outside of a corresponding notch along the second horizontal lateral wall, and the second horizontal direction is opposite to the first horizontal direction.

6. The virtual reality glasses according to claim 1, wherein the device fastener comprises:
    a device fixing seat configured to fasten the second end of the external electronic device and to slide along a second slide rail on the second surface; and
    a second elastic element, wherein when the device fixing seat is at a position other than the minimum fastening position, the second elastic element is deformed to cause a tendency for returning the device fixing seat to the minimum fastening position.

7. The virtual reality glasses according to claim 1, wherein the fastening structure further comprises at least one lateral side fastener to fasten the external electronic device at a lateral side position of the external electronic device.

8. The virtual reality glasses according to claim 1, further comprising:
    a device bouncing-up structure comprising a support member in a preset hole in the second surface, and a third elastic element arranged at a bottom of the support member,
    wherein:
        when the external electronic device is fastened to the second surface, the external electronic device presses the support member to cause the third elastic element to be deformed as well as cause at least a portion of the support member to be retracted into the preset hole; and
        when fastening of the external electronic device is released by the device fastener, the third elastic element drives the support member to extend outside of the preset hole to lift up the external electronic device.

9. The virtual reality glasses according to claim 1, further comprising a wearing structure configured to secure the glasses body to the user's face,
    wherein the wearing structure comprises:
        a fixed connection portion, wherein a bottom of the fixed connection portion is fixedly connected to a top portion of the glasses body; and
        a wearing adjustment portion, wherein the fixed connection portion and the wearing adjustment portion each have an arc shape to form a ring structure that fits the user's head, and the wearing adjustment portion is configured to adjust a size of the ring structure.

10. The virtual reality glasses according to claim 9, wherein the wearing adjustment portion comprises:
    an adjustment portion body having an adjusting gear therein; and
    an adjustment band extending out from the adjustment portion body, wherein a first end of the adjustment band is connected with the fixed connection portion, and a gear belt is provided at a portion of the adjustment band near a second end of the adjustment band and cooperates with the adjusting gear,
    wherein:
        when the adjusting gear is rotated towards a first direction, the adjusting gear cooperates with the gear belt to extend the adjustment band further outside of adjustment portion body, thereby enlarging the ring structure; and
        when the adjusting gear is rotated towards a second direction, the adjusting gear cooperates with the gear belt to retract the adjustment band further into the adjustment portion body, thereby decreasing the ring structure.

11. The virtual reality glasses according to claim 10, wherein the adjustment portion body includes an adjustment knob configured to rotate synchronously with the adjusting gear,
    wherein:
        a self-locking protrusion is provided at a surface of the adjustment knob, and the self-locking protrusion is able to engage with a self-locking recess in an inner wall of the adjustment portion body;
        when the self-locking protrusion engages with the self-locking recess, the adjusting gear and the adjustment knob are switched to a rotation self-locking state, in which adjustment of the size of the ring structure is limited; and
        when the self-locking protrusion detaches from the self-locking recess, the adjusting gear and the adjustment knob are switched to a free rotation state, in which the size of the ring structure is adjustable via rotation of the adjusting gear and the adjustment knob.

12. The virtual reality glasses according to claim 11, wherein:
    at least a portion of the adjustment knob extends outside through a preset opening in the adjustment portion body;
    when the adjustment knob is moved under action of a first external force to a first side of the preset opening along a first axis direction of the adjustment knob, the adjustment knob is switched to the rotation self-locking state; and
    when the adjustment knob is moved under action of a second external force to a second side of the preset opening along a second axis direction of the adjustment knob, the adjustment knob is switched to the free rotation state and is driven by the second external force to rotate so as to adjust the size of the ring structure.

13. The virtual reality glasses according to claim 11, wherein the adjustment portion body further comprises;
    an adjustment button, wherein an installation position of the adjustment button on the adjustment portion body corresponds to the adjustment knob, and when the adjustment button is pressed by an external force, the adjustment button pushes the adjustment knob to move, thereby switching the adjustment knob to the free rotation state; and
    a fourth elastic element, wherein the fourth elastic element is deformed when the adjustment knob is switched to the rotation self-locking state, and when the external force stops pressing the adjustment button, the fourth elastic element drives the adjustment knob to return to the rotation self-locking state.

14. The virtual reality glasses according to claim 9, wherein the wearing adjustment portion is rotatably connected with the fixed connection portion.

15. The virtual reality glasses according to claim 1, further comprising:
    an object distance adjusting structure configured to adjust a distance between a lens assembly in the glasses body and the external electronic device,
    wherein the object distance adjusting structure comprises:

an object distance adjusting knob, wherein at least a portion of the object distance adjusting knob extends outside through a preset opening in the glasses body;

an adjusting nut and an adjusting threaded rod, wherein the adjusting nut is secured on the lens assembly and the adjusting threaded rod is in engagement with the adjusting nut, and the adjusting nut and the adjusting threaded rod are oriented towards the external electronic device; and a helical gear set, wherein the helical gear set is rotated along with the object distance adjusting knob when the object distance adjusting knob is driven by an external force to rotate, and drives the adjusting threaded rod to rotate, so as to adjust the distance between the lens assembly and the external electronic device through a relative rotation between the adjusting nut and the adjusting threaded rod.

* * * * *